United States Patent
Meyers et al.

(10) Patent No.: US 11,565,887 B2
(45) Date of Patent: Jan. 31, 2023

(54) METHOD AND APPARATUS FOR CLEANING AND SANITIZING CONVEYOR BELTS

(71) Applicant: Sheldon Meyers, Brockport, NY (US)

(72) Inventors: Sheldon Meyers, Brockport, NY (US); Michael Schrlau, Pittsford, NY (US); Chad Uckermark, Rochester, NY (US)

(*) Notice: Subject to any disclaimer, the term of this patent is extended or adjusted under 35 U.S.C. 154(b) by 0 days.

(21) Appl. No.: 17/322,878

(22) Filed: May 17, 2021

(65) Prior Publication Data

US 2021/0354932 A1    Nov. 18, 2021

Related U.S. Application Data

(60) Provisional application No. 63/026,717, filed on May 18, 2020.

(51) Int. Cl.
*B65G 45/22* (2006.01)
*B65G 39/073* (2006.01)

(52) U.S. Cl.
CPC ........... *B65G 45/22* (2013.01); *B65G 39/073* (2013.01)

(58) Field of Classification Search
CPC ...... B65G 45/22; B65G 39/073; B65G 45/12; B65G 45/14; B65G 45/16; B65G 45/18; B65G 45/24; A47F 9/02

USPC .................................................. 198/495–499
See application file for complete search history.

(56) References Cited

U.S. PATENT DOCUMENTS

| | | | | |
|---|---|---|---|---|
| 4,960,200 A * | 10/1990 | Pierce | ..... | B65G 45/24 |
| | | | | 198/502.1 |
| 6,971,503 B2 * | 12/2005 | Thompson | ..... | B65G 45/22 |
| | | | | 198/496 |
| 7,077,260 B2 * | 7/2006 | Saballus | ..... | B65G 45/22 |
| | | | | 134/122 R |
| 7,225,915 B2 * | 6/2007 | Kelly | ..... | B65G 45/22 |
| | | | | 198/494 |
| 8,978,875 B2 * | 3/2015 | Barboni | ..... | B65G 45/22 |
| | | | | 198/497 |
| 9,096,392 B1 * | 8/2015 | Barragan | ..... | B65G 45/22 |
| 9,248,975 B2 * | 2/2016 | Handy | ..... | B65G 45/26 |
| 10,266,348 B1 * | 4/2019 | Yoo | ..... | B65G 45/18 |

* cited by examiner

*Primary Examiner* — Mark A Deuble
(74) *Attorney, Agent, or Firm* — Andrew Morabito

(57) ABSTRACT

A conveyor belt cleaning apparatus, comprising; a case, wherein the case is designed to secure to a conveyor belt assembly; a frame member, wherein the frame member is secured to the case; at least one spray nozzle attached to the frame member; at least one pump connected to the at least one spray nozzle; a solution reservoir connected to the at least one pump; at least one applicator attached to the frame member and positioned relative to the at least one spray nozzle.

16 Claims, 9 Drawing Sheets

METHOD AND APPARATUS FOR CLEANING AND SANITIZING CONVEYOR BELTS

CROSS-REFERENCE TO RELATED APPLICATIONS

This application is a continuation-in-part (and claims the benefit of priority under 35 USC 120) of U.S. application No. 63/026,717 filed May 18, 2020. The disclosure of the prior applications is considered part of (and is incorporated by reference in) the disclosure of this application.

BACKGROUND OF THE INVENTION

The present invention relates to conveyor belts, and more particularly to a sanitizing attachment for conveyor belts.

It has been recognized in the industry and by the public in general that conveyor belts used in store checkouts (e.g., grocery stores, home good stores, etc.) can be a source of contamination of foods or other purchased items, due to the large number items that are in physical contact with the conveyor belt. For example, food products, cleaners, medicines, chemical products (e.g., glues, adhesives, polishes, etc.) may come in contact with the conveyor belt surfaces. Additionally, individuals may touch, sneeze, or drool on the belt, which may lead to direct exposure to various diseases. However, the conveyor belt is not easily removed, and cleaning may not be performed on a regular basis. Accordingly, this can lead to both real and perceived dangers of contamination from the conveyor belt. Now more than ever it is vital to keep these surfaces clean to help prevent the spread of disease or viruses.

One of the many challenges for check-out cashiers who operate conveyor belts is the maintenance of the belt. The cashier must ensure that the conveyor belt is kept clean, and that their customers have a clean place to set their groceries. Grocery stores carry a wide variety of products, including fresh and frozen vegetables, containers of milk and ice cream, fresh fish, poultry, and beef, along with household cleaning solutions and chemicals, such as soaps and bleach. Despite significant improvements in product packaging, it is a fact that many products still leak fluids. Loose wrapping may allow leaks on the belt, such as the juices from raw meats. Or plastic bottles with a loose lid, may leave sticky fluids on the conveyor belt. Since the fluids and debris left on the conveyor belt may be from uncooked meat, poultry, fish, or perhaps a leaky bleach or medicine bottle, bacteria and/or toxins can leave behind contamination. It is known that people coming in contact with bad forms of bacteria and/or toxins can such as those that can be found on conveyor belts can become sick from any number of foodborne or other viral diseases, Therefore, unsantitized belts can lead to significant health and safety concerns to both to shoppers and store employees.

Due to these concerns, it is routine for a cashier to have a bottle of cleaner and/or disinfectant at their station. Armed with a roll of paper towels, or some form of cloth wiper it is a typical practice for cashiers to periodically spray any particular type of cleaner which may or may not include sanitizers/disinfectants onto their conveyor belt in order to wipe away dirt, a smudge, smear or collection of unknown substances. Unfortunately, when there is a long line of anxious customers, or there are no more towels or disinfectant solution available to the cashier, it is possible that the conveyor belt is not cleaned often enough. In addition, the thoroughness of the cleaning/sanitizing is only as good as the training and quality of work performed by the employee. This can be particularly troubling when considering the types of fluids that may exist on the surface of the conveyor belt as mentioned above and which can include uncooked food drippings laced with bacteria such as *Escherichia coli* (*E-coli*), *Salmonella*, and other assorted viral bacteria and fungi.

Although some automatic cleaning systems for conveyor belts have been attempted, these existing systems often involve an internal sprayer that dispenses directly on the belt from underneath. However, if the spray from underneath begins operating while a customer is actively loading the belt with products that they intend to purchase, that section will not have been effectively sanitized. This same ineffectiveness can happen if the employee/cashier starts spraying cleaner/sanitizer after the products to be purchased had already been placed onto the belt. In both instances, when the conveyor belt is actively in use, the initial spray is performed in front of where products are being placed.

These internal solutions for cleaning and sanitizing conveyor belts are complicated, costly, and difficult to maintain. Accordingly, it would be beneficial to have a cleaning system that can be added to both new and existing conveyor belt systems with easy and quick installation, low maintenance requirements, and simple to operate.

It is desired to have an attachment to the conveyor belt that is easy to install, provides an efficient and effective sanitizing of the conveyor belt, and provides customers with the reassurance that the conveyor belt is sanitized. In effect, adding an additional and more complete layer of protection against foodborne and viral illness.

SUMMARY

In a first embodiment, the present invention is a conveyor belt cleaning apparatus, comprising: a case, wherein the case is designed to secure to a conveyor belt assembly; a frame member, wherein the frame member is secured to the case; at least one spray nozzle attached to the frame member; at least one pump connected to the at least one spray nozzle; a solution reservoir connected to the at least one pump; at least one applicator attached to the frame member and positioned relative to the at least one spray nozzle.

In a second embodiment, the present invention is a conveyor belt cleaning apparatus, comprising: a frame member secure to a conveyor belt assembly; a sprayer assembly, wherein the spray assembly comprises a pump, a spray nozzle, and a solution reservoir; at least one applicator attached to the frame member and positioned relative to the spray nozzle; and a positioning system attached to the at least one applicator.

In a third embodiment, the present invention is a conveyor belt cleaning apparatus, comprising: a frame member; at least one spray nozzle attached to the frame member; at least one pump connected to the at least one spray nozzle; a solution reservoir connected to the at least one pump.

DETAILED DESCRIPTION OF THE INVENTION

Figure 1:
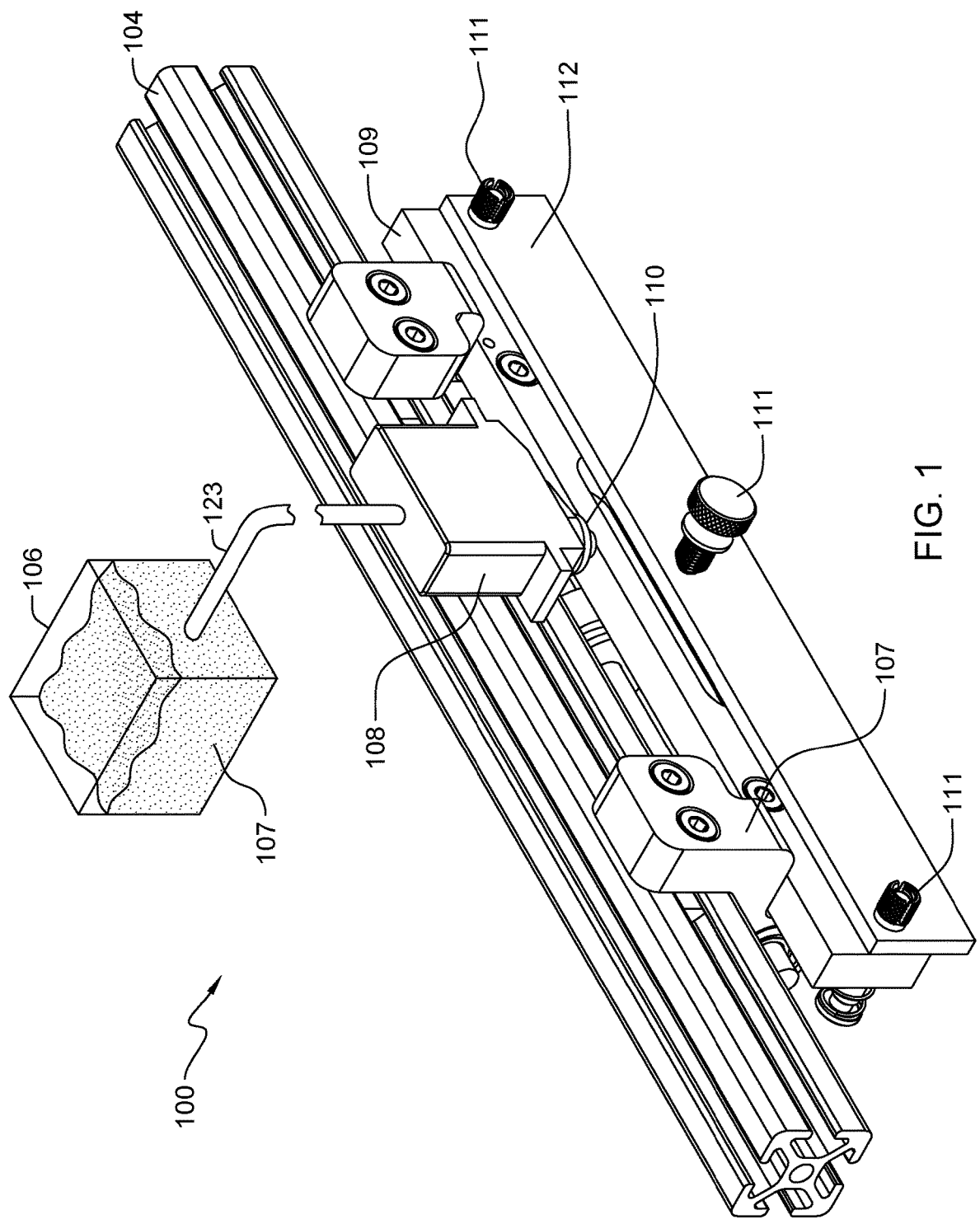
FIG. 1 depicts an isometric view of a conveyor belt sanitizing apparatus in an in-use position, in accordance with one embodiment of the present invention.

The present invention provides a device which is able to both clean and sanitize conveyor belt. The device is designed to be attached to a variety of different conveyor belts configurations, thereby creating a versatile device which is not limited to a single type of conveyor belt. The device is secured to the conveyor belt and is able to apply a cleaning solution directly on the conveyor belt to assist in providing a clean and sanitized surface for a person to place their groceries or for other applications where a sterile conveyor belt is preferred. The section of the conveyor belt which is cleaned is that in which the customer would be directly placing their items on. This is advantageous over the prior art due to its straightforward design, ease of installation, versatility, simplicity of operation, and efficiency in cleaning/sanitizing the conveyor belt surface.

The prior art is either complex systems which are built into the actual conveyor belt, meaning the systems are expensive and isolated to a single conveyor belt. They also can require tremendous amounts of work to repair and maintain. The alternative to this is to have a person spray a cleaner or sanitizing agent onto the conveyor belt. This has two flaws, first it requires unnecessary manpower and leaves chances where the person is missing sections of the conveyor belt. In this instance the quality and coverage of the cleaner/sanitizer is only as good as the training and quality of the employees' work. Second, the person is usually spraying the material at the end of the belt which is returned to the interior of the machine, and the section in which the customer is placing their groceries was not cleaned or sanitized, defeating the purpose of the person spraying the disinfectant.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 2:
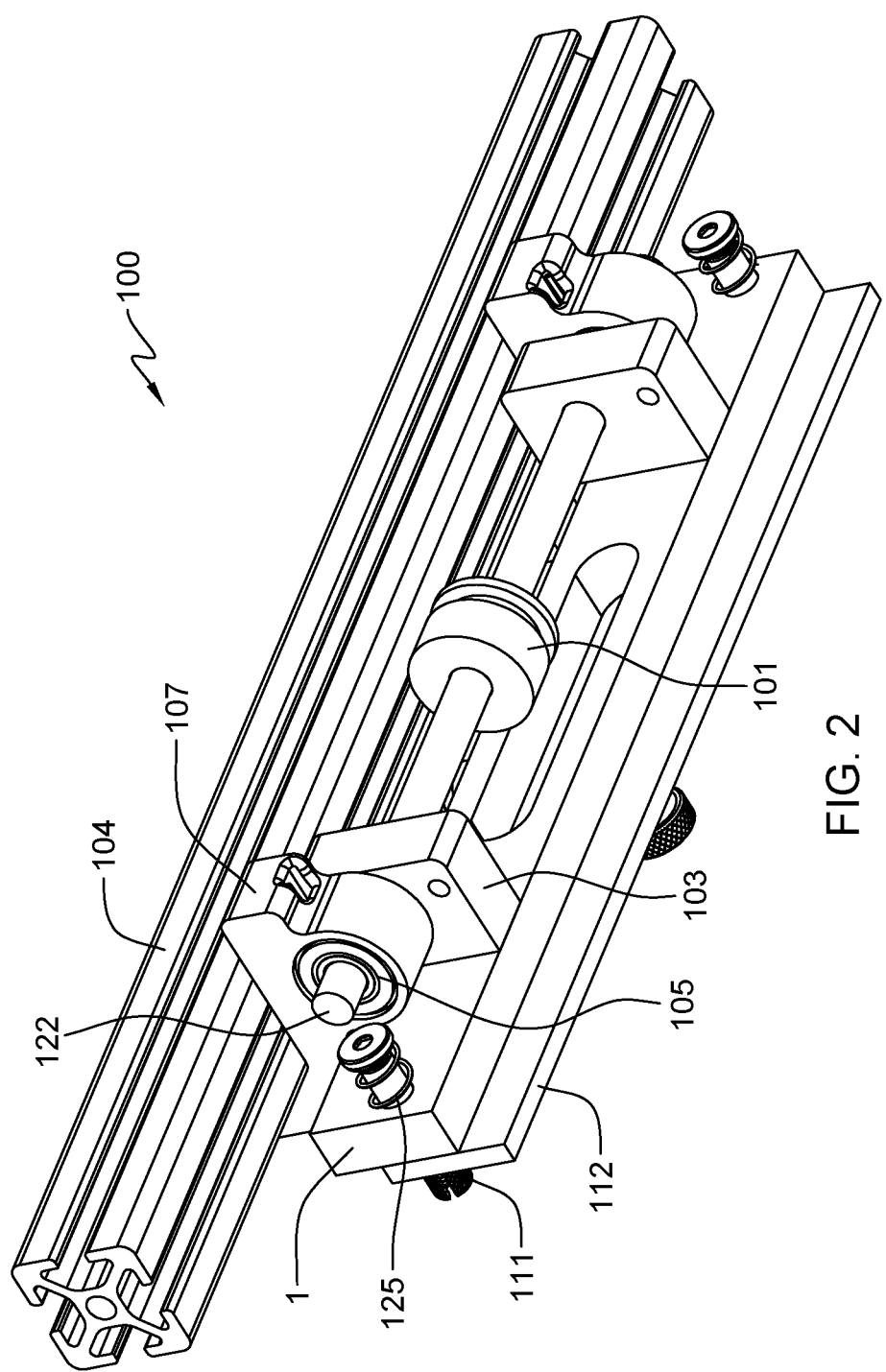
FIG. 2 depicts another isometric view of the conveyor belt sanitizing apparatus, in accordance with one embodiment of the present invention.
Figure 3:
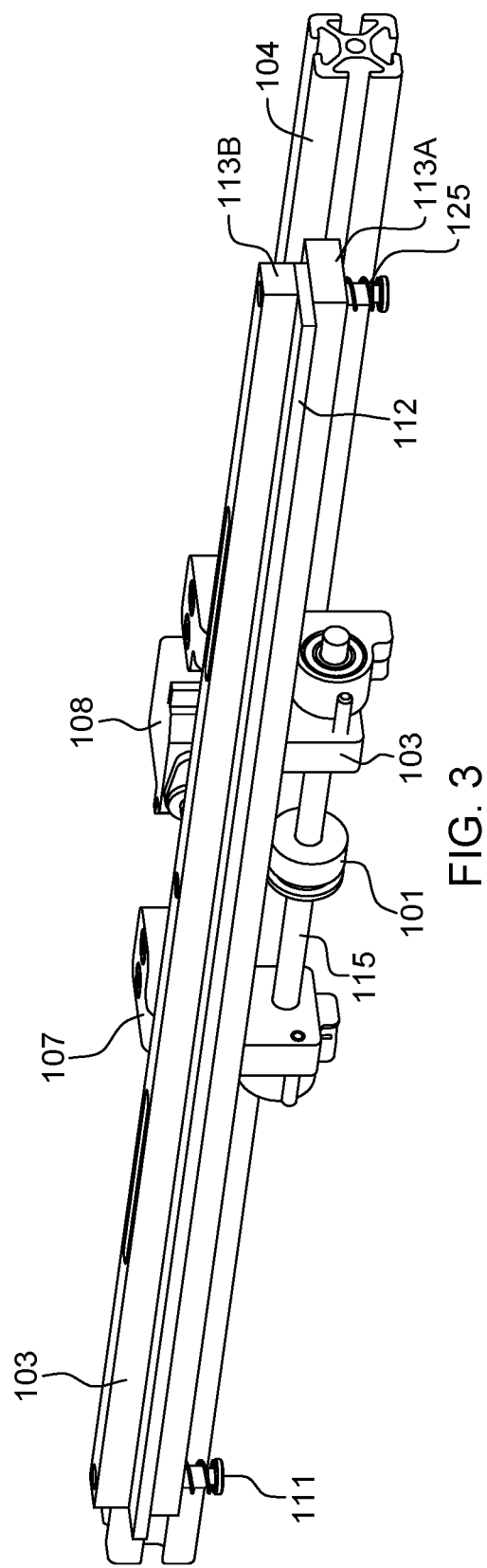
FIG. 3 depicts an isometric view of the conveyor belt sanitizing apparatus in a stored position, in accordance with one embodiment of the present invention.

FIGS. 1-3 depicts various view and illustrations of a conveyor belt sanitizing apparatus 100, in accordance with one embodiment of the present invention.

A frame member 104 provides the structure in which a pump 108, a spray nozzle 110, an applicator 112, and a mounting system are attached to. The frame member 104 is used to secure the conveyor belt sanitizing apparatus 100 to the conveyor belt and provide the structure and mounting for the conveyor belt sanitizing apparatus 100. In the depicted embodiment, the frame member 104 is a section of extruded material with grooves to mount the various components too. In other embodiments the frame member 104 may take on a variety of forms.

The mounting system is secured to the frame member 104 and is used to support the applicator 112. The mounting system 107 is comprised of the frame mounts 107 which are attached to the frame member 104 using fasteners or the like. The frame mounts 107 have bearings 105 which are secured within an opening of the frame mounts 107. A rod 115 passes through the bearings 105. Secured to the rod 115 is an actuating device 101 which assists in the rotation of the rod 115. Applicator mounts 103 are secured to the rod 113 and also secured to an applicator support 113A. The applicator 112 is secured to the applicator support 113A through fasteners 111. In the depicted embodiment, an applicator support 113B is used to further secure the applicator 112, and the fasteners 111 have springs 125 which assist in keeping a firm fit of the applicator 112 to the support(s) 113A. As shown in FIGS. 2 and 3, the applicator 112 is able to move from a first position (FIG. 3) where the applicator 112 is not in use, to a second position (FIG. 2) where the applicator would be in use. This articulation is performed by the actuating device 101 being activated and electronically and/or mechanically moving the applicator 112.

A pump 108 is connected to a solution container 106 to draw solution 107 from the solution container 106 and expel the solution 107 through the spray nozzle 110 onto the conveyor belt so that the applicator can evenly distribute the solution 107 across the entire surface of the conveyor belt. In the depicted embodiment, the spray nozzle 110 and the pump 108 are a single component with the pump 108 and the spray nozzle 110 integrated into a single housing and attached to the frame 104. This sprayer provides all the mechanical components needed to spray the solution 107 onto the conveyor belt. In other embodiments, the pump 108 and the spray nozzle 110 may be a separate component. This can be implemented in a setup with multiple spray nozzles 110 and a single pump 108.

The spray nozzle 110 breaks apart the fluid flow from the pump 108 and transfers it into a spray pattern. The spray pattern maybe, but not limited to; flat, stream, cone, hollow cone, mist, or the like. The spray nozzle 110 is designed to apply a coating of the solution 107 over the substantial area of the conveyor belt in front of the applicator 112. The applicator 112 then distributed the solution 107 across the conveyor belt substantially covering the entire surface of the conveyor belt with the solution 107. The solution consistency also has an effect on the spray nozzle 110 design and function. Based on the spray nozzle 110 design and the desired result, more or less spray nozzles may be incorporated into the design.

The applicator 112 is designed to spread, apply, or brush the solution 107 onto the conveyor belt so that the solution 107 comes in contact with the entire surface of the conveyor belt. The applicator 112 is sized to provide complete coverage of the conveyor belt so as to provide a substantial coverage of the conveyor belt with the solution. Based on the versatility of the present invention and the design, the applicator 112 may be removed and replaced with various sized (width, height, and depth) based on the conveyor belt size. This is easily accomplished by removing the fasteners 111 and installing a new applicator 112. The applicator 112 may be constructed from a variety of materials based on the intended design, the type of pumps used or the like. In one embodiment, the applicator 112 is made from a non-porous material such as rubber. The rubber material provides a semi-firm surface to spread the solution 107 on the belt. In other embodiments, the applicator 112 is a porous material, such as, but not limited to, a squeegee, foam, felt, weatherstripping, brush, or the like. The shape and size of the applicator 112 again is based on the application process of the solution 107, the solution consistency, and the conveyor belt design. The applicator 112, may have various profiles, shapes, curvatures, and designs based on the intended application of the solution 107. In some embodiments, multiple applicators 112 are integrated into the design. In the present embodiment, the applicator 112 is a rectangular piece of material which is in a stationary position.

A solution container 106 provides the reservoir for the solution 107. The solution container 106 may be integrated into the case 102 or may be connected to the pump 108 via a fluid line 123. This allows the solution container 106 to be located distal to the person operating the conveyor belt for easy refilling or replacement of the solution container 106. In some instances the solution container 106 is an assembly with a solution reservoir which is replaceable and a solution reservoir receiving unit to allow for easy replacement when a solution reservoir is employ. In some embodiments, the pump 108 is integrated into the solution container 106.

Figure 4:
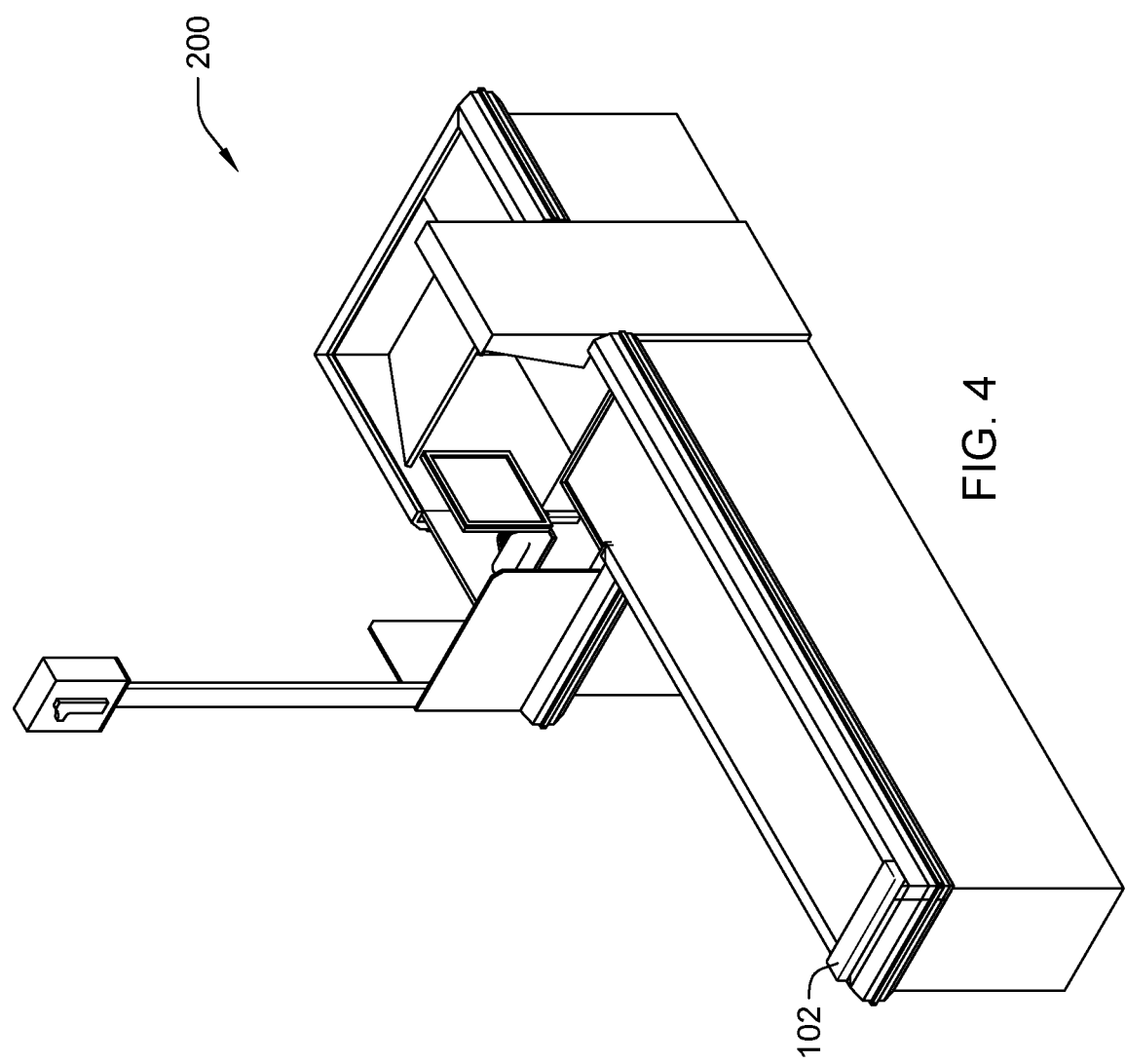
FIG. 4 depicts an isometric view of the conveyor belt sanitizing apparatus installed on a conveyor belt, in accordance with one embodiment of the present invention.

Shown in FIG. 4 is a conveyor belt 200 with the device 100 installed at the far end of the conveyor belt, and enclosed within cover 102. The case 102 is designed to encapsulate the remainder of the elements of the apparatus 100 to provide protection to these elements and create an enclosed space for the elements to operate. The case 102 may be made from, but not limited to polyethylene, polyethylene terephthalate, high-density polyethylene, polypropylene, polystyrene, polyvinyl chloride, polyurethane, poly carbonate, polybutylene terephthalate, acrylonitrile styrene acrylate, acrylics, aluminum, steel, cooper, various other metals, a combination of plastics and metals, or the like. The shape of the case 102 is based on the conveyor belt design. The location of the device 100 at the far end of the conveyor belt means that, when in use, that any surface which is exposed to the customer has been cleaned and/or sterilized.

Figure 5:
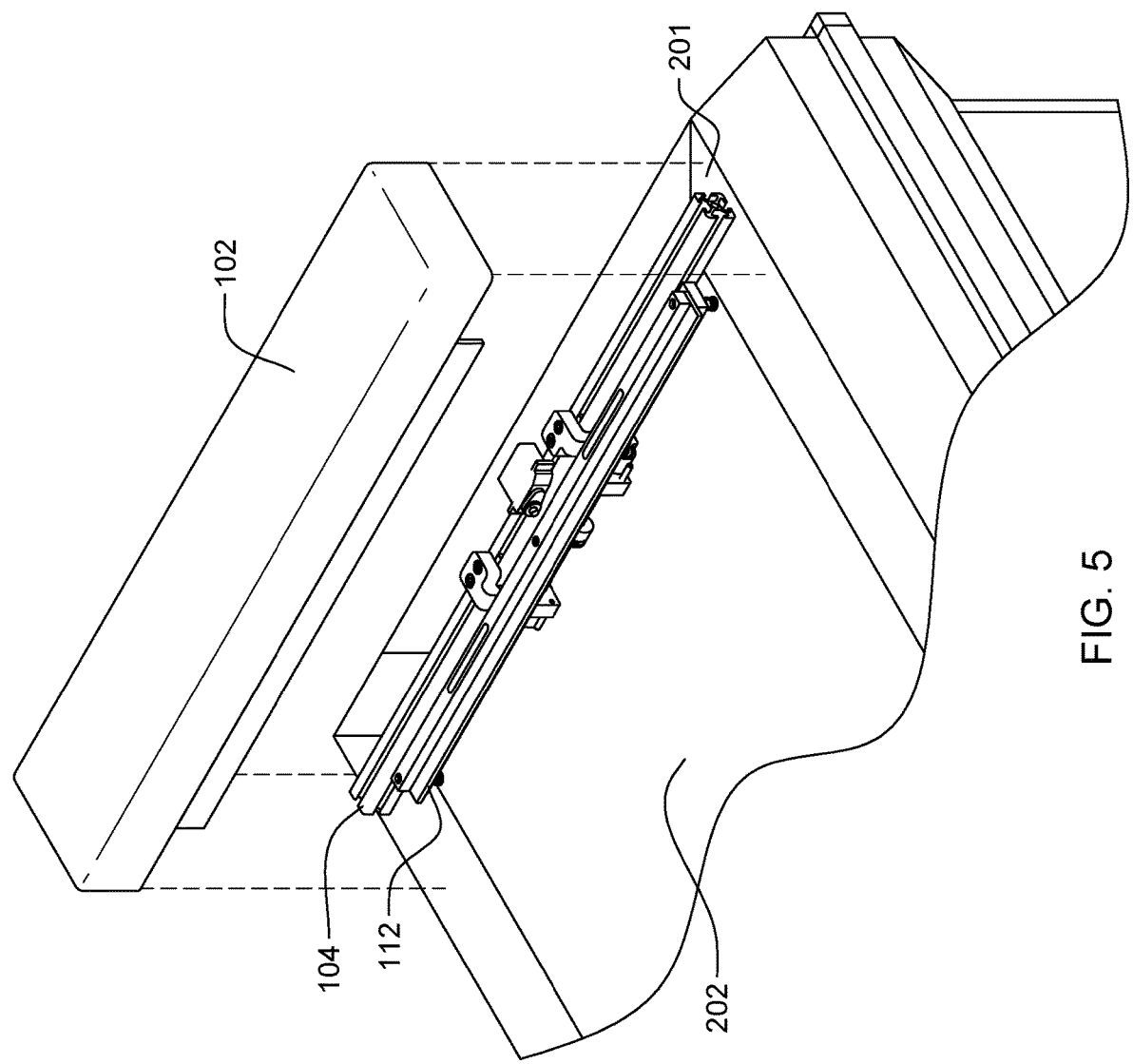
FIG. 5 depicts an exploded view of the installed conveyor belt sanitizing apparatus, in accordance with one embodiment of the present invention.
Figure 6:
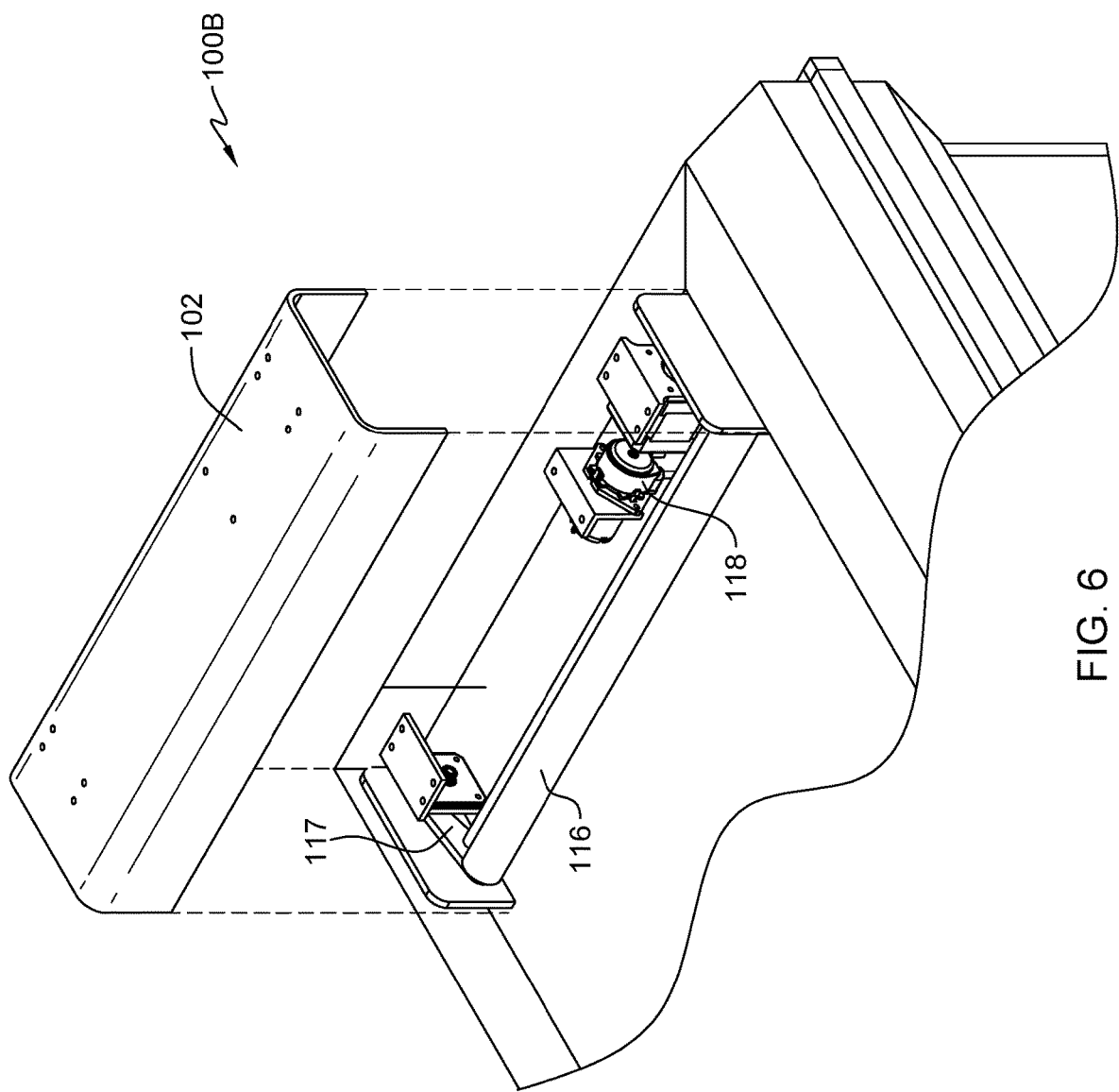
FIG. 6 depicts an isometric view of a conveyor belt sanitizing apparatus installed on a conveyor belt with a cover removed, in accordance with another embodiment of the present invention.
Figure 7:
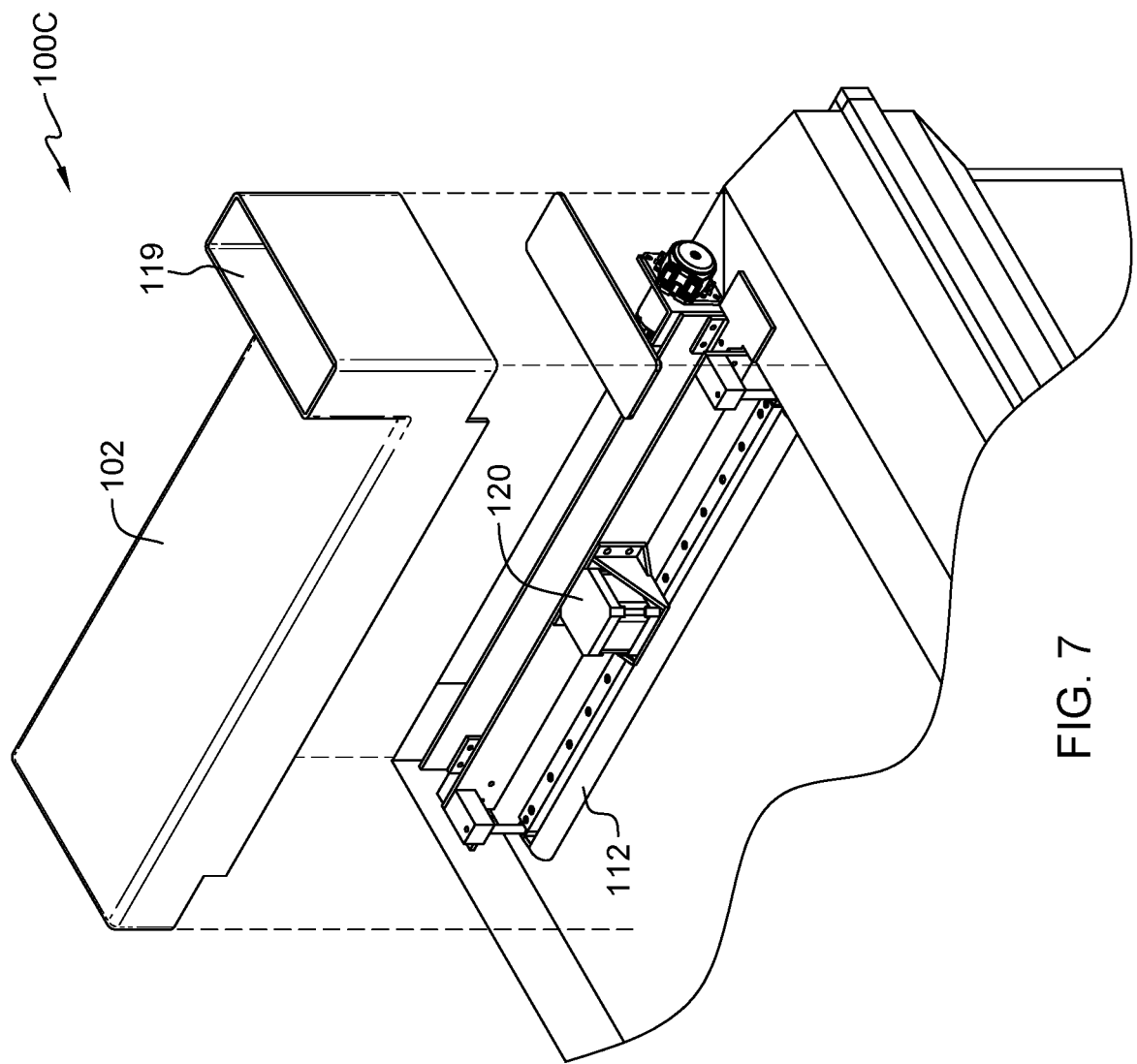
FIG. 7 depicts an isometric view of a conveyor belt sanitizing apparatus installed on a conveyor belt with a cover removed, in accordance with another embodiment of the present invention.
Figure 8:
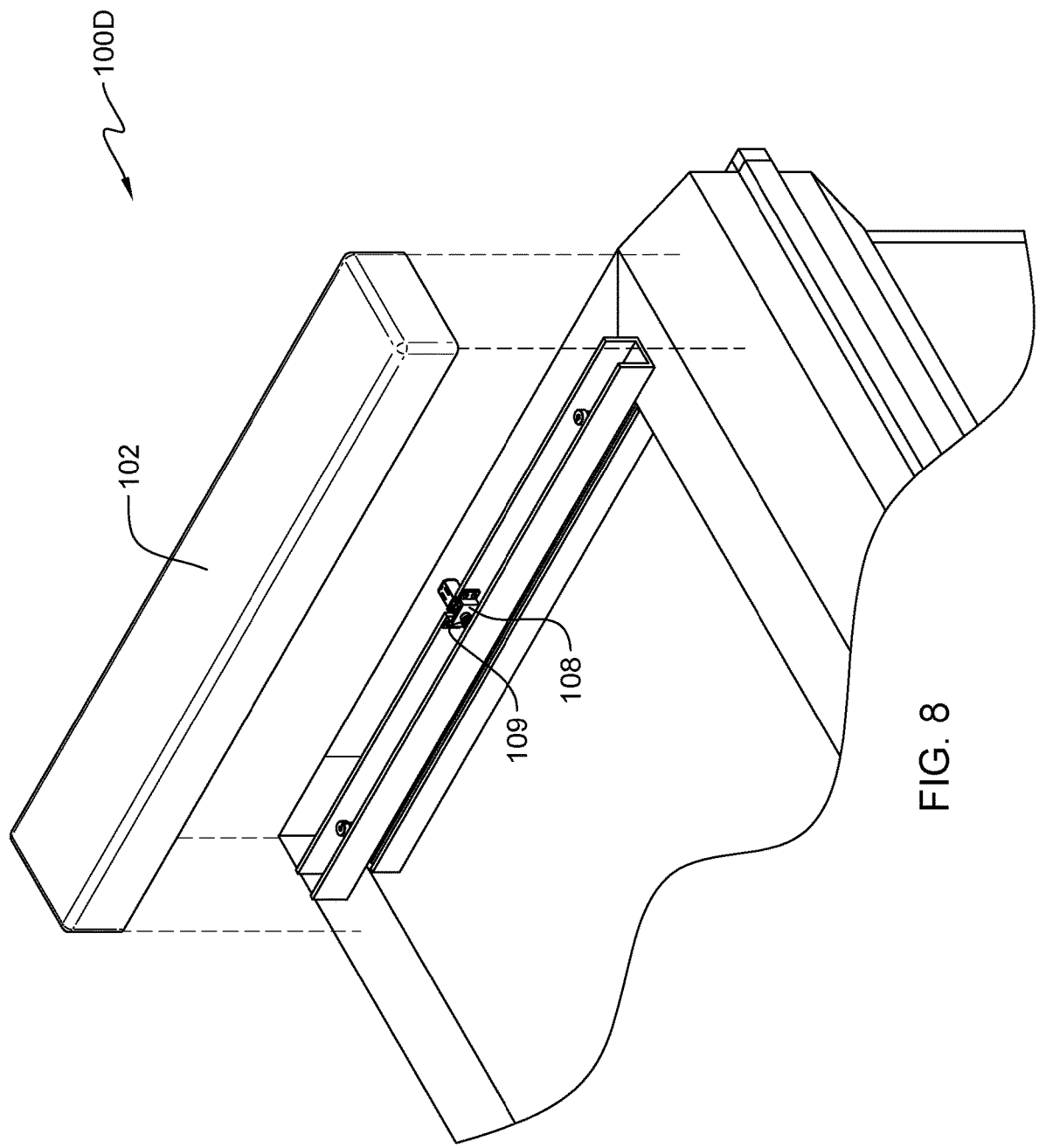
FIG. 8 depicts an isometric view of a conveyor belt sanitizing apparatus installed on a conveyor belt with a cover removed, in accordance with another embodiment of the present invention.
Figure 9:
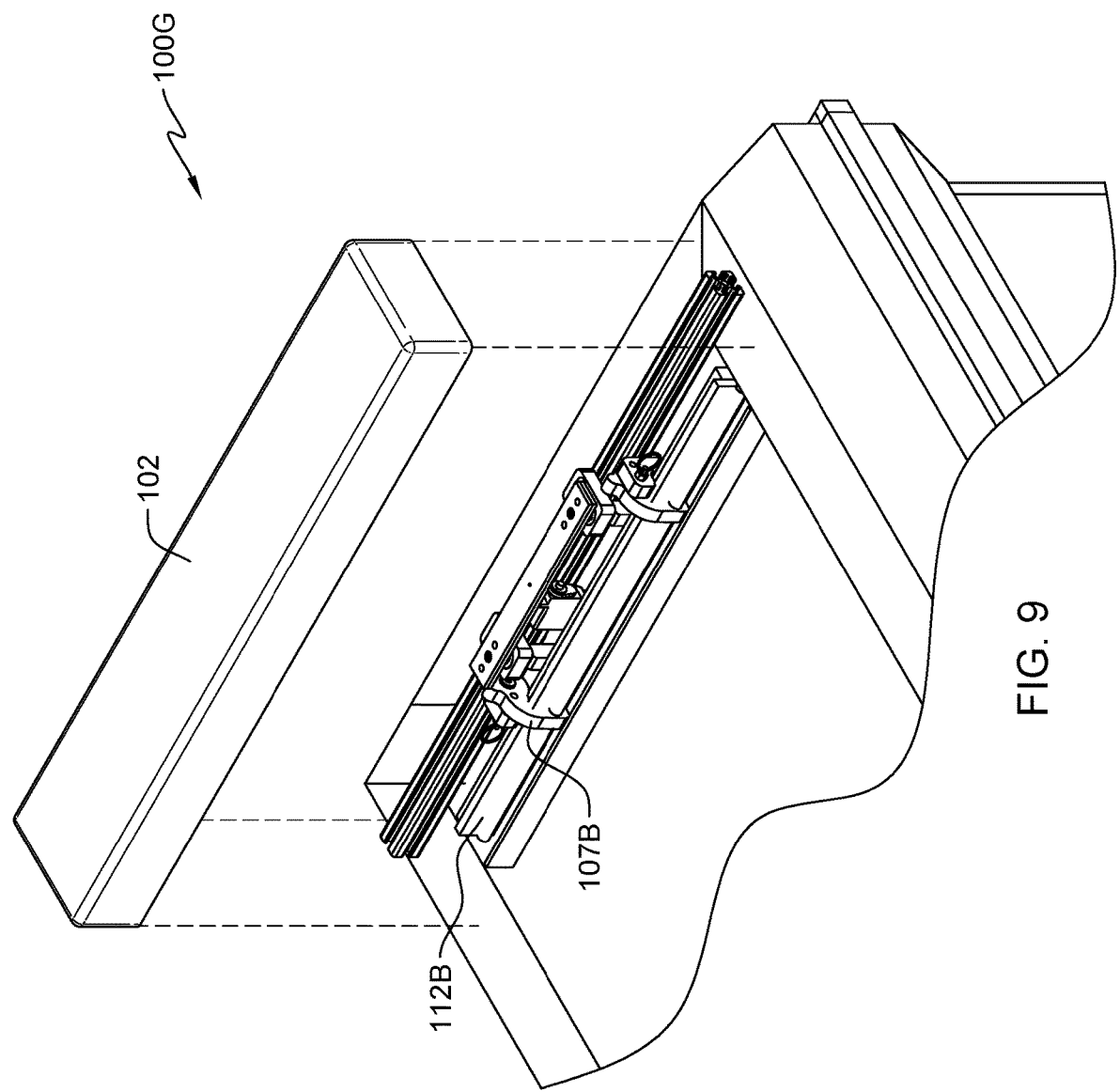
FIG. 9 depicts an isometric view of a conveyor belt sanitizing apparatus installed on a conveyor belt with a cover removed, in accordance with another embodiment of the present invention.

As shown in FIGS. 5-10 various embodiments of the device are shown installed and with the cover removed. In a first embodiment, FIGS. 5 and 9 depict designs with an articulating system to engage and disengage the applicator 112. The frame 104 is mounted to the conveyor belt frame 201. FIG. 6 depicts an embodiment where the applicator 112 is a roller 116. The roller 116 has arms 117 which are connected to motor 118 to raise and lower the roller 116. The applicator 112 is a roller, which is secured to the frame 104 on a set of bearings or the like to allow the applicator 112 to rotate with the movement of the conveyor belt. FIG. 7 depicted an embodiment, where the applicator 112 is connected to a delivery system which injects the solution 107 into the applicator 112. This removes the need for the spray nozzles 107 as the applicator 112 is injected with the solution to keep a moist state. In this embodiment, the case 102 is shown to have a reservoir 119 where solution 119 can be stored. The frequency, and volume of the spray nozzle 110 is based on the system design and the desired results. FIG. 8 depicted an embodiment, where the applicator 112 is removed and the spray nozzle 108 is used to apply the solution 107 directly on the conveyor belt.

The spray nozzle 110 is directed towards the conveyor belt so that the spray nozzle 110 applies the solution 107 to the conveyor belt, and the applicator 112 assists in spreading the solution 107 across the entire surface due to the force applied by the applicator 112. In other embodiments, the spray nozzle 110 may be angled towards the applicator 112, where the solution 107 is applied to the applicator 112 (e.g. porous applicator designs). In some embodiments, the spray nozzle 110 is replaced with an injection system, wherein the solution 107 is injected into the applicator 112 and is then applied to the conveyor belt through the pressure of the applicator 112 against the conveyor belt.

In use, the applicator 112 is in contact with the conveyor belt and is spreading the solution across the conveyor belt surface. Where the applicator 112 is made of a porous material, the applicator 112 absorbs the solution 107 and due to the pressure of the applicator 112 on the conveyor belt, the solution 107 is applied to the conveyor belt. Where the applicator 112 is made from a non-porous material, it is spreading the solution 107 evenly across the entire surface of the conveyor belt. In some embodiments, removes excess solution 107 on the conveyor belt.

The method of operation of the present invention may take on many forms based on the conveyor belt operation and the preferred application of the solution 107. It may operate in a manual or automatic style modes. In some embodiments, a computing device is integrated into the system, where the computing device is able to receive a command to active the system, in which the applicator is moved from a "resting" position to an "active" position and the pump 108 is activated. The applicator 112 is pressed against the conveyor belt and the pump 108 and spray nozzle 110 spray the solution 107, The system may be preprogramed based on the conveyor belt design and the device assembly. The system may be activated manually by the cashier. The device may have an internal battery or may be integrated into an external power source, such as the conveyor belt. Based on the type of solution and the solution's efficiencies (e.g., dwell time), which is being used to clean the conveyor belt, the time/frequency when the system is in use may differ. For example, some solutions may only require this been done once an hour and when customers are not putting their items on the conveyor belt, so the system would be in use during "down time." In other embodiments, the solution may be a fast-drying solution and can be run at higher frequency or even when customers are placing items on the conveyor belt.

While the process discussed in conjunction with the method is fully capable of achieving the objects of the present invention, the order of the process is not intended to be limiting as to the available sequence of events or activities. Rather, the method is merely exemplary of the process of a preferred embodiment, and no limitations are intended.

While the particular conveyor belt cleaning apparatus of the present invention as herein shown and disclosed in detail is fully capable of obtaining the objects and providing the advantages herein before stated, it is to be understood that it is merely illustrative of the presently preferred embodiments of the invention and that no limitations are intended to the details of use, construction or design herein shown other than as described in the appended claims.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A conveyor belt cleaning apparatus, comprising:
   a case, wherein the case is designed to secure to a conveyor belt assembly;
   a frame member, wherein the frame member is secured to the case;
   at least one spray nozzle attached to the frame member;
   at least one pump connected to the at least one spray nozzle;
   a solution reservoir connected to the at least one pump;
   at least one applicator attached to the frame member and positioned relative to the at least one spray nozzle; and
   a positioning system attached the at least one applicator to the frame, wherein the positioning system repositions the at least one applicator about one axis of movement.

2. The conveyor belt cleaning apparatus of claim 1, further comprising, a tension system in communication with the at least one applicator.

3. The conveyor belt cleaning apparatus of claim 1, wherein the at least one applicator is constructed from a porous material.

4. The conveyor belt cleaning apparatus of claim 1, wherein the at least one applicator is constructed from a non-porous material.

5. The conveyor belt cleaning apparatus of claim 1, further comprising, a computing device in electrical communication with the at least one pump.

6. The conveyor belt cleaning apparatus of claim 1, wherein the solution reservoir, further comprises, a base; and a solution container, wherein the solution container connected with the base.

7. The conveyor belt cleaning apparatus of claim 1, wherein the at least one applicator is removable.

8. The conveyor belt cleaning apparatus of claim 1, wherein the tension system is adjustable.

9. A conveyor belt cleaning apparatus, comprising:
   a frame member secure to a conveyor belt assembly;
   a sprayer assembly, wherein the spray assembly comprises a pump, a spray nozzle, and a solution reservoir;
   at least one applicator attached to the frame member and positioned relative to the spray nozzle; and
   a positioning system attached to the at least one applicator, wherein the positioning system attached the at least one applicator to the frame and rotates the at least one applicator about a pivot point.

10. The conveyor belt cleaning apparatus of claim 9, wherein the at least one applicator is made from a non-porous material.

11. The conveyor belt cleaning apparatus of claim 9, wherein the at least one applicator is made from a porous material.

12. The conveyor belt cleaning apparatus of claim 9, wherein the at least one applicator is a roller.

13. A conveyor belt cleaning apparatus, comprising:
   a frame member;
   at least one spray nozzle attached to the frame member;
   at least one pump connected to the at least one spray nozzle;
   a case, wherein the case encapsulates the frame member, pump, spray nozzle, and applicator; and
   a solution reservoir connected to the at least one pump, wherein the solution reservoir is located distal to the case.

14. The conveyor belt cleaning apparatus of claim 13, further comprising a control mechanism which activates the at least one pump.

15. The conveyor belt cleaning apparatus of claim 13, wherein the solution reservoir has a replaceable solution container.

16. The conveyor belt cleaning apparatus of claim 13, wherein the control mechanism is integrated into the conveyor belt.

* * * * *